US009475976B2

(12) United States Patent
Vasquez et al.

(10) Patent No.: US 9,475,976 B2
(45) Date of Patent: Oct. 25, 2016

(54) METHODS AND COMPOSITIONS OF IMPROVING WELLBORE CLEANOUT TREATMENTS

(71) Applicant: Halliburton Energy Services, Inc., Houston, TX (US)

(72) Inventors: Julio Estuardo Vasquez, Houston, TX (US); B. Raghava Reddy, Houston, TX (US); Natalie Lynn Pascarella, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 197 days.

(21) Appl. No.: 13/897,559

(22) Filed: May 20, 2013

(65) Prior Publication Data
US 2014/0338916 A1 Nov. 20, 2014

(51) Int. Cl.
*E21B 43/12* (2006.01)
*C09K 8/52* (2006.01)

(52) U.S. Cl.
CPC ..................... *C09K 8/52* (2013.01)

(58) Field of Classification Search
CPC ...... E21B 43/12; E21B 43/025; E21B 43/00; E21B 37/08; C09K 8/508; C09K 8/52
USPC ................. 166/312, 276, 278, 310
See application file for complete search history.

(56) References Cited

U.S. PATENT DOCUMENTS

| | | | |
|---|---|---|---|
| 4,982,793 A | 1/1991 | Holtmyer et al. | |
| 5,067,565 A | 11/1991 | Holtmyer et al. | |
| 5,122,549 A | 6/1992 | Holtmyer et al. | |
| 6,207,771 B1 | 3/2001 | Larson | |
| 6,364,016 B1 | 4/2002 | Dalrymple et al. | |
| 6,476,169 B1 | 11/2002 | Eoff et al. | |
| 6,516,885 B1 | 2/2003 | Munday | |
| 7,114,568 B2 | 10/2006 | Eoff et al. | |
| 7,117,942 B2* | 10/2006 | Dalrymple ........... C09K 8/5083 166/278 |
| 7,589,048 B2 | 9/2009 | Eoff et al. | |
| 7,595,283 B2 | 9/2009 | Eoff et al. | |
| 7,759,292 B2 | 7/2010 | Eoff et al. | |
| 8,008,235 B2 | 8/2011 | Eoff et al. | |
| 8,273,692 B2 | 9/2012 | Eoff et al. | |
| 2004/0069538 A1 | 4/2004 | Reddy et al. | |
| 2004/0220058 A1 | 11/2004 | Eoff et al. | |
| 2006/0124309 A1* | 6/2006 | Nguyen ................. C09K 8/508 166/308.2 |
| 2006/0137875 A1* | 6/2006 | Dusterhoft ............ C09K 8/508 166/276 |
| 2009/0253594 A1 | 10/2009 | Dalrymple et al. | |
| 2010/0216672 A1* | 8/2010 | Todd ....................... C09K 8/516 507/201 |
| 2011/0005773 A1* | 1/2011 | Dusterhoft ............... C09K 8/52 166/376 |
| 2011/0034351 A1 | 2/2011 | Eoff et al. | |
| 2011/0232905 A1* | 9/2011 | Iverson .................... C04B 28/02 166/275 |
| 2012/0168166 A1* | 7/2012 | Dalrymple ........... C09K 8/5083 166/310 |
| 2012/0258894 A1* | 10/2012 | Eoff ....................... C09K 8/035 507/222 |
| 2012/0264885 A1 | 10/2012 | Eoff et al. | |
| 2013/0098618 A1* | 4/2013 | Braganza ............... C09K 8/685 166/305.1 |

FOREIGN PATENT DOCUMENTS

WO 2014189698 A1 11/2014

OTHER PUBLICATIONS

International Search Report and Written Opinion for PCT/US2014/037630 dated Sep. 1, 2014.
Berry et al., "Case Histories of Wellbore Cleanouts Using Near-Neutral Derusting Solution," SPE 89716, SPE Annual Technical Conference and Exhibition, Houston, TX Sep. 26-29, 2004.

* cited by examiner

*Primary Examiner* — Angela M DiTrani
*Assistant Examiner* — Ashish Varma
(74) *Attorney, Agent, or Firm* — McDermott Will & Emery LLP; Craig Roddy

(57) ABSTRACT

Methods of performing a cleanout treatment including providing a wellbore in a subterranean formation having unconsolidated particulates therein; providing a treatment fluid comprising an aqueous base fluid and a hydrophobically modified flocculating water-soluble polymer; introducing the treatment fluid into the wellbore in the subterranean formation; flocculating at least a portion of the unconsolidated particulates by exposure to the hydrophobically modified flocculating water-soluble polymer; removing the treatment fluid comprising the flocculated unconsolidated particulates from the wellbore in the subterranean formation.

17 Claims, No Drawings

METHODS AND COMPOSITIONS OF IMPROVING WELLBORE CLEANOUT TREATMENTS

BACKGROUND

The present invention relates to methods and compositions of improving wellbore cleanout treatments.

Subterranean formations containing hydrocarbons are often penetrated by one or more wellbores and acid treated with aqueous acid compositions to stimulate production of hydrocarbons therefrom. In some treatments, the aqueous acid composition is introduced into the wellbore under pressure so that it flows through the pore spaces of the formation and reacts with acid soluble materials contained therein. By doing so, the aqueous acid composition enlarges the pore spaces through which hydrocarbons may flow and be recovered. Such acid treatments also involve pumping an acid into the wellbore through equipment tubulars used during subterranean formation operations (e.g., treating lines, pumping equipment, tubing string, and the like), which also beneficially removes contaminant debris (e.g., scale, mud or cement deposits, corrosion byproducts, and the like) from the internal surfaces of the tubulars. Indeed, the process of removing contaminant debris from equipment tubulars, may be performed even without acid treating the formation.

While acid treating a wellbore in a subterranean formation provides beneficial advantages to hydrocarbon production and equipment maintenance, such treatment may also cause undesirable unconsolidated particulates to remain in the wellbore. For example, the acid may cause mineral dissolution and particulate precipitation (e.g., iron oxide, silica, and the like) from the subterranean formation itself and/or the equipment tubulars. Such unconsolidated particulates may gather in the newly enlarged pore spaces of the formation and effectively negate some or all of the benefits of acid treating the formation. Therefore, acid treatments are generally preceded by cleanout treatments that recirculate the unconsolidated particulates back to the surface and out of the wellbore, and prepare the wellbore and tubulars to receive acidic fluids. Such treatments are often referred to as acid pickling or pickling treatments, and the fluids are often referred to as acid pickling or pickling fluids. Typically, such cleanout treatments use weakly acidic viscous pills containing viscosifiers such as uncrosslinked hydroxyethyl cellulose liner gel pills used for suspending particulates and/or corrosion inhibitors to minimize corrosion to the tubulars during the treatment. Linear gel pills comprise aqueous uncrosslinked polymer solutions. However, such viscous pills often have only moderate to low success rates at capturing and removing unconsolidated particulates. The low success rate may be attributed to an inability to sufficiently suspend the unconsolidated particulates. The viscous pills may additionally reduce permeability in the formation, such as by plugging of the near-wellbore formation pores with particulates due to unwanted fluid leak-off in the formation.

Therefore, a cleanout treatment fluid capable of providing suspension of unconsolidated particulates or fluid loss control may be of benefit to one of ordinary skill in the art.

SUMMARY OF THE INVENTION

The present invention relates to methods and compositions of improving wellbore cleanout treatments.

In some embodiments, the present invention provides a method of performing a cleanout treatment comprising: providing a wellbore in a subterranean formation having unconsolidated particulates therein; providing a treatment fluid comprising an aqueous base fluid and a hydrophobically modified flocculating water-soluble polymer; introducing the treatment fluid into the wellbore in the subterranean formation; flocculating at least a portion of the unconsolidated particulates by exposure to the hydrophobically modified flocculating water-soluble polymer; removing the treatment fluid comprising the flocculated unconsolidated particulates from the wellbore in the subterranean formation.

In other embodiments, the present invention provides a method comprising: providing a wellbore in a subterranean formation; providing an acid fluid comprising a first aqueous base fluid and an acid; providing a treatment fluid comprising a second aqueous base fluid and a hydrophobically modified flocculating water-soluble polymer; acid treating the wellbore in the subterranean formation with the acid fluid, thereby forming unconsolidated particulates; introducing the treatment fluid into the wellbore in the subterranean formation; flocculating at least a portion of the unconsolidated particulates by exposure to the hydrophobically modified flocculating water-soluble polymer; removing the treatment fluid comprising the flocculated unconsolidated particulates formed from the acid treatment from the wellbore in the subterranean formation.

In still other embodiments, the present invention provides a method of performing a cleanout treatment comprising: providing a wellbore in a subterranean formation having unconsolidated particulates therein; providing a treatment fluid comprising an aqueous base fluid, a hydrophobically modified flocculating water-soluble polymer, and a corrosion inhibitor, wherein the corrosion inhibitor is solubilized in the treatment fluid by contact with the hydrophobically modified flocculating water-soluble polymer; introducing the treatment fluid into the wellbore in the subterranean formation; flocculating at least a portion of the unconsolidated particulates by exposure to the hydrophobically modified flocculating water-soluble polymer; removing the treatment fluid comprising the flocculated unconsolidated particulates from the wellbore in the subterranean formation.

The features and advantages of the present invention will be readily apparent to those skilled in the art upon a reading of the description of the preferred embodiments that follows.

DETAILED DESCRIPTION

The present invention relates to methods and compositions of improving wellbore cleanout treatments. In particular, the present invention relates to the suspension and removal of unconsolidated particulates from a wellbore in a subterranean formation, such as after an acid treatment or from weakly consolidated formation.

The methods of the present invention use a hydrophobically modified flocculating water-soluble polymer in a treatment fluid that provides flocculated suspension of unconsolidated particulates, and may provide fluid loss control properties to improve cleanout of unconsolidated particulates from wellbores. The hydrophobically modified flocculating water-soluble polymer may cause unconsolidated particulates to form flocculated aggregates with decreased formation penetrability, allowing greater recovery of the unconsolidated particulates from the wellbore and to the surface because they are not so small as to become trapped in formation pore spaces. The hydrophobic compounds contained on the hydrophobically modified flocculating water-soluble polymer may also assist in the suspension and removal of undesirable oil soluble residues, such as from grease, pipe dope, or oil soluble surfactants used with some subterranean operations equipment. Additionally, the hydrophobically modified flocculating water-soluble polymer may impart fluid loss control properties to the treatment fluid, further reducing the tendency of the unconsolidated particulates to settle into pore spaces within the formation. The hydrophobically modified flocculating water-soluble polymers of the present invention may additionally operate as relative permeability modifiers that may be capable of controlling water production from or cleanout fluid penetration into a subterranean formation without significantly reducing the permeability of the formation to oil and/or gas. Furthermore, the hydrophobically modified polymers may also aid in dissolution of corrosion inhibitors for a more homogeneous coating of tubulars to protect against acid-induced corrosion. Therefore, the hydrophobically modified flocculating water-soluble polymers of the present invention may serve multiple functions for use in subterranean formation operations.

In some embodiments, the present invention provides a method of performing a cleanout treatment in a wellbore in a subterranean formation having unconsolidated particulates. A treatment fluid comprising an aqueous base fluid and a hydrophobically modified flocculating water-soluble polymer is introduced into the wellbore. At least a portion of the unconsolidated particulates are then flocculated and suspended. Finally, the treatment fluid comprising the flocculated unconsolidated particulates is removed from the wellbore.

As used herein, the term "hydrophobically modified" refers to a monomer or polymer having hydrophobic compound(s) chemically attached thereto. The hydrophobically modified flocculating water-soluble polymer for use in the present invention may be cationic; anionic; nonionic; and any combination thereof. Typically, the hydrophobically modified flocculating water-soluble polymers have molecular weights in the range of from about 500,000 to about 10,000,000, preferably in the range of from about 1,000,000 to about 8,000,000. These high molecular weight of the hydrophobically modified flocculating water-soluble polymers of the present invention contribute to their flocculating capabilities. The hydrophobically modified flocculating water-soluble polymer may be synthesized by any method known to those having ordinary skill in the art, such as by a polymerization reaction.

In some embodiments, the hydrophobically modified flocculating water-soluble polymer of the present invention may be synthesized by hydrophobic modification of a hydrophilic polymer. Suitable hydrophilic polymers may include, but are not limited to, a polyacrylamide; a poly(methacrylamide); a polyvinylamine; a poly(vinyl alcohol); polyvinyl acetate; an alkyl acrylate; a polyacrylate; a polyethylene oxide; a polyethylene oxide methyl ether; a polyethylene glycol; a cellulose; a chitostan; a polyamide; a polyetheramine; a polyethyleneimine; a polyhydroxyetheramine; a polylysine; a polysulfone; a starch; a gum; a poly(itaconic acid); a poly((E)-but-2-enoic acid); a poly(acrylic acid); a poly(malonic acid); a poly(methacrylic acid); a poly(maleic acid); a poly(maleic anhydride); a poly(citraconic anhydride); a poly(2-acrylannidonnethylpropanesulfonic acid); a poly(1-allyloxy-2-hydroxypropyl sulfonic acid); a poly(vinyl pyrrolidone); a poly(N-vinyl formamide); a poly(diallyldimethylammonium chloride); a poly(diallyldimethylammonium sulfate); a poly(methacrylamidopropyltrimethylammonium chloride); a poly(methacryloylethyltrimethylamine); a poly(dimethylaminopropyl methacrylamide); a poly(2-methacryloxyethyltrimethylammonium chloride); poly(hydroxyethyl acetate); a poly(vinylsulfonic acid); poly(vinylphosphonic acid); a poly(N-vinyl caprolactam); a poly(N-vinylformamide); a polymer of N,N-diallylacetamide; a poly(dimethyldiallyl-ammonium halide); a poly(styrene sulfonic acid); a polymer of methacrylamidoethyltrimethyl ammonium halide; a poly(N,N-dimethylacrylamide); a poly(dimethylaminoethyl methacrylate); any derivative thereof; any copolymer thereof; any terpolymer thereof; and any combination thereof.

Specific hydrophilic polymers for use in the hydrophobically modified flocculating water-soluble polymers of the present invention may include, but are not limited to, a poly(acrylamide/dimethylaminoethyl methacrylate); a poly(methacrylic acid/dimethylaminoethyl methacrylate; a poly(2-acrylamido-2-methyl propane sulfonic acid/dimentylaminoethyl methacrylate); a poly(acrylamide/dimethylaminopropyl methacrylamide); a poly(acrylic acid/dimethylaminopropyl methacrylamide); a poly(methacrylic/dimethylaminopropyl methacrylamide); a polymer of acrylic acid and a C10-C30 alkyl acrylate; any copolymer thereof; any terpolymer thereof; and any combination thereof.

In some embodiments, the hydrophobically modified flocculating water-soluble polymers of the present invention may be synthesized by a reaction of hydrophilic monomer(s) capable of forming any of the hydrophilic polymers of the present invention, followed by hydrophobic modification of the hydrophilic polymer. In other embodiments, the hydrophilically modified flocculating water-soluble polymer of the present invention may be formed by a reaction comprising a hydrophilic monomer(s) and a hydrophobically modified hydrophilic monomer(s). The hydrophilic monomer(s) for use in any capacity, including as hydrophilic monomer(s) or as hydrophobically modified hydrophilic monomer(s), of the present invention may be any monomer capable of forming any hydrophilic polymer that is capable of hydrophobic modification either in its monomer form (as is the case with the hydrophobically modified hydrophilic monomer) or after reacting to form a hydrophilic polymer to become a hydrophobically modified flocculating water-soluble polymer. Suitable hydrophilic monomers, for example, for use in the present invention in any capacity may be any monomer capable of forming the hydrophilic polymers described herein. Examples of suitable hydrophilic monomers include, but are not limited to, acrylamide; methacrylamide; vinylamine; vinyl alcohol; vinyl acetate; alkyl acrylate; an acrylate salt of alkali earth metal; an acrylate salt of alkaline earth methal; ethylene oxide; ethylene glycol; glucose; glucosamine; an amide; an amine; ethyleneimine; lysine; a sulfone; acrylic acid; methacrylic acid; an alkali earth metal salt of methacrylic acid; an alkaline earth metal salt of methacrylic acid; 2-acrylamido-2-methyl propane sulfonic acid; an alkali earth metal salt of 2-acrylamido-2-methyl propane sulfonic acid; an alkaline earth metal salt of 2-acrylamido-2-methyl propane sulfonic acid; N,N-dimethylacrylamide; vinyl pyrrolidone; dimethylaminoethyl methacrylate; dimethylaminopropylmethacrylamide; trimethylammoniumethyl methacrylate chloride; hydroxyethyl acrylate; vinyl sulfonic acid; an alkali earth metal salt of vinyl sulfonic acid; an alkaline earth metal salt of vinyl sulfonic acid; vinyl phosphonic acid; an alkali earth metal salt of vinyl phosphonic acid; an alkaline earth metal salt of vinyl phosphonic acid; vinyl caprolactam; N-vinylformamide; N,N-diallylacetamide; dimethyl-diallyl-ammonium halide; itaconic acid; styrene sulfonic acid; methacrylamidoethyltrimethyl ammonium halide; (E)-but-2-enoic acid; malonic acid; maleic acid; maleic anhydride; citraconic anhydride; 1-allyloxy-2-hydroxypropyl sulfonic acid; N-vinyl formamide; diallyldimethylammonium chloride; diallyldimethylammonium sulfate; methacrylamidopropyltrimethylammonium chloride; hydroxyethyl acetate; octadecyldimethylammoniumethyl methacrylate bromide; hexadecyldimethylammoniumethyl methacrylate bromide; hexadecyldimethylammoniumpropyl methacrylamide bromide; 2-ethylhexyl methacrylate; hexadecyl methacrylamide; quaternary salt derivatives of acrylamide; quaternary salt derivatives of acrylic acid; and any combination thereof.

In some embodiments, the hydrophilic monomers, hydrophilic polymers, and/or the hydrophobically modified hydrophilic monomers of the present invention may additionally be hydrophilically modified so as to, for example, introduce or enhance branching, so long as the function of the hydrophobically modified flocculating water-soluble polymer is not adversely affected. The hydrophilic modification may occur before or after hydrophobic modification to a hydrophilic monomer or a hydrophilic polymer and may be achieved using one or more hydrophilic groups. Any hydrophilic group capable of introducing or enhancing branching may be used for hydrophilic modification. Suitable hydrophilic groups may include, but are not limited to, a hydroxyl group; a carbonyl group; a carboxyl group; a sulfhydryl group; an amino group; a phosphate group; a polyether group; any derivative thereof; and any combination thereof. Preferably, if a polyether group is used for hydrophilic modification, it also comprises a halogen; sulfonate; sulfate; organic acid; epichlorohydrin-terminated polyethylene oxide methyl ether; or a derivative thereof. Suitable polyether groups include, but are not limited to, polyethylene oxide; polypropylene oxide; polybutylene oxide; copolymers thereof; terpolymers thereof; and any combination thereof. Typically, the hydrophilic modification of the hydrophilic monomers, hydrophilic polymers, and/or the hydrophobically modified hydrophilic monomers has a weight ratio in the range of from about 1:1 to about 10:1.

In some embodiments, the backbone of the hydrophobically modified flocculating water-soluble polymer (e.g., the hydrophilic polymer backbone formed before or after hydrophobic modification with hydrophobic compound(s)) may comprise reactive amino groups capable of reacting with hydrophobic groups. Suitable amino groups may include, but are not limited to, a dimethyl-amino group; a dimethylaminoethyl methacrylate; a dimethylaminopropyl methacrylamide; and any combination thereof. In other embodiments, the hydrophobically modified water-soluble polymer backbone may comprise polar heteroatoms including, but not limited to, oxygen; nitrogen; sulfur; phosphorous; and any combination thereof.

The hydrophobic compounds capable of reacting with the hydrophilic polymer or a hydrophilic monomer to form the hydrophobically modified water-soluble polymers of the present invention may include an alkyl halide; a sulfonate; a sulfate; an organic acid; any derivative thereof; and any combination thereof. Suitable hydrophobic compounds include, but are not limited to, octenyl succinic acid; an anhydride of octenyl succinic acid; an ester of octenyl succinic acid; an imide of octenyl succinic acid; an amide of octenyl succinic acid; dodecenyl succinic acid; an anhydride of dodecenyl succinic acid; an ester of dodecenyl succinic acid; an imide of dodecenyl succinic acid; an amide of dodecenyl succinic acid; vinyl ester; alkyl ester of acrylic acid; alkylaryl alcohol ester of acrylic acid; alkyl ester of methacrylic acid; alkylaryl alcohol ester of methacrylic acid; alkyl halide; butadiene; 1-vinylnaphthalene; and any combination thereof. In certain embodiments, the hydrophobic compound may have an alkyl chain length of from about 6 to about 22 carbons. In another embodiment, the hydrophobic group may have an alkyl chain length of from about 7 to about 20 carbons. In still other embodiments, the hydrophobic compound may have an alkyl chain length of from about 12 to about 18 carbons.

In those embodiments in which the hydrophobically modified water-soluble polymers of the present invention are formed by first providing a hydrophilic polymer or by providing a hydrophilic polymer after polymerizing hydrophilic monomers, the molar ratio of hydrophilic polymer or hydrophilic monomers to hydrophobic compound(s) is in the range of from about 99.98:0.02 to about 90:10. In those embodiments in which the hydrophobically modified water-soluble polymer of the present invention is formed by a polymerization reaction of a hydrophilic monomer(s) and a hydrophobically modified hydrophilic monomer(s), the molar ratio of the hydrophilic monomer(s) to hydrophobically modified hydrophilic monomer(s) in the hydrophobically modified water-soluble polymer is in the range of from about 99.98:0.02 to about 90:10.

One suitable hydrophobically modified water-soluble polymer is HPT-1®, a hydrophobically-modified, partially hydrolyzed poly(dimethyaminoethylmethacrylate) cationic polymer available from Halliburton Energy Services, Inc. of Houston, Tex. Specific synthetic procedures and disclosure relating to HPT-1® are described in commonly owned U.S. Pat. No. 7,114,568, which is incorporated herein by reference in its entirety.

As previously mentioned, in some embodiments of the present invention, the hydrophobically modified flocculating water-soluble polymer acts as a relative permeability modifier for the subterranean formation so as to reduce permeability of the subterranean formation to water. In other embodiments, the treatment fluids of the present invention comprising the hydrophobically modified flocculating water-soluble polymers described herein may further comprise a supplemental polymer selected from the group consisting of a non-hydrophobically modified flocculating polymer; a relative permeability modifier polymer; and any combination thereof.

These supplemental polymers may enhance the flocculating and/or relative permeability effect of the hydrophobically modified flocculating water-soluble polymers of the present invention. For example, the relative permeability modifier, when placed inside the subterranean formation, may aid in blocking or resisting the flow of aqueous fluids without substantially altering the flow of hydrocarbon fluids. Additionally, the non-hydrophobically modified flocculating polymer may enhance the flocculating capabilities of the hydrophobically modified flocculating water-soluble polymers of the present invention. In some cases, the supplemental polymers for addition into the treatment fluids disclosed herein serve both as a relative permeability modifier and a non-hydrophobically modified flocculating polymer. In some embodiments the non-hydrophobically flocculating polymer and/or the relative permeability modifier polymer are present in the treatment fluids in total an amount of from about 0.5% to about 5% by weight of the treatment fluid, preferably in total in an amount of from about 0.1% to about 1% by weight of the treatment fluid. One of ordinary skill in the art, with the benefit of this disclosure will recognize what ratio of each supplemental polymer to include in a particular treatment fluid, if any, to achieve a particular result. Factors may include, but are not limited to, the type of hydrophobically modified flocculating water-soluble polymer chosen, the conditions of the subterranean formation (e.g. temperature, the likelihood of unconsolidated particulates, permeability, and the like), and the nature of the operation being performed.

Suitable relative permeability modifier polymer(s) may include, but are not limited to polyacrylamide; hydrolyzed polyacrylamide; xanthan; scleroglucan; a polysaccharide; an amphoteric polymer made from acrylamide, acrylic acid, and diallyldimethylammonium chloride; a vinyl sulfonate/vinyl amide/acrylamide terpolymer; a vinyl sulfonate/acrylamide copolymer; an acrylamide/acrylamido-methylpropanesulfonic acid copolymer; an acrylamide/vinylpyrrolidone copolymer; sodium carboxymethyl cellulose; poly[dialkylaminoacrylate-co-acrylate-g-poly(ethyleneoxide)]; and any combination thereof. Relative permeability modifier polymer(s) for use in the present invention include those disclosed in U.S. Pat. Nos. 4,982,793, 5,067,565, and 5,122,549, the entire disclosures of which are incorporated herein by reference. Suitable non-hydrophobically modified flocculating polymers include, but are not limited to, a polyacrylamide; a poly(diallyldimethylammonium chloride); a polyethylene oxide; and any combination thereof.

Examples of suitable commercially available non-hydrophobically modified flocculating polymers for use as supplemental polymers in the treatment fluids of the present invention include, but are not limited to MAGNAFLOC®, SUPERFLOC®, and HYPERFLOC®, available from BASF Corporation, and UCARFLOC™ available from Dow Chemical Company.

Aqueous base fluids suitable for use in the treatment fluids of the present invention may comprise fresh water; saltwater (e.g., water containing one or more salts dissolved therein); brine (e.g., saturated salt water); seawater; and any combination thereof. Generally, the water may be from any source, if it does not contain components that might adversely affect the stability and/or performance of the treatment fluids of the present invention. In certain embodiments, the density of the aqueous base fluid can be adjusted to, among other purposes, provide additional particulate transport and suspension in the treatment fluids used in the methods of the present invention. In certain embodiments, the pH of the aqueous base fluid may be adjusted (e.g., by a buffer or other pH adjusting agent), among other purposes, to activate a crosslinking agent and/or to increase the viscosity of the first treatment fluid (e.g., by activating the hydration of a polymer). In these embodiments, the pH may be adjusted to a specific level, which may depend on, among other factors, the types of gelling agents, acids, and other additives included in the treatment fluid. One of ordinary skill in the art, with the benefit of this disclosure, will recognize when such density and/or pH adjustments are appropriate. In some embodiments, the pH range may preferably be from about 4 to about 11.

In some embodiments, the treatment fluids of the present invention may further comprise an additive including, but not limited to, a viscosifying agent; a crosslinking agent; a corrosion inhibitor; and any combination thereof. Viscosifying agents may be used to increase the viscosity of the treatment fluid. In certain embodiments, the viscosifying agent may comprise one or more polymers that have at least two molecules that are capable of forming a crosslink in a crosslinking reaction in the presence of a crosslinking agent, and/or polymers that have at least two molecules that are so crosslinked (i.e., a crosslinked viscosifying agent). The viscosifying agents may be naturally-occurring viscosifying agents; synthetic viscosifying agents; and any combination thereof. The viscosifying agents also may be cationic viscosifying agents; anionic viscosifying agents; and any combination thereof. Suitable viscosifying agents include, but are not limited to, polysaccharides; biopolymers; any derivatives thereof that contain one or more of these monosaccharide units: galactose; mannose; glucoside; glucose; xylose; arabinose; fructose; glucuronic acid; pyranosyl sulfate; and any combination thereof (e.g., homopolymers, copolymers, terpolymers, quad polymers, and the like). Examples of suitable polysaccharides include, but are not limited to, guar gums (e.g., hydroxyethyl guar, hydroxypropyl guar, carboxymethyl guar, carboxymethylhydroxyethyl guar, and carboxymethylhydroxypropyl guar ("CMHPG")); cellulose derivatives (e.g., hydroxyethyl cellulose, carboxyethylcellulose, carboxymethylcellulose, and carboxymethylhydroxyethylcellulose); xanthan; scleroglucan; succinoglycan; diutan; and combinations thereof.

Suitable synthetic polymers include, but are not limited to, acrylamide ethyltrimethyl ammonium chloride; acrylamide; acrylamido alkyl trialkyl ammonium salt; methacrylamido-alkyl trialkyl ammonium salt, acrylamidomethylpropane sulfonic acid; acrylamidopropyl trimethyl ammonium chloride; acrylic acid; dimethylaminoethyl methacrylamide; dimethylaminoethyl methacrylate; dimethylaminopropyl methacrylamide; dimethylaminopropylmethacrylamide; dimethyldiallylammonium chloride; dimethylethyl acrylate; fumaramide; methacrylamide; methacrylamidopropyl trimethyl ammonium chloride; methacrylamidopropyldimethyl-n-dodecylammonium chloride; methacrylamidopropyldimethyl-n-octylammonium chloride; methacrylamidopropyltrimethylammonium chloride; methacryloylalkyl trialkyl ammonium salts; methacryloylethyl trimethyl ammonium chloride; methacrylylamidopropyldimethylcetylammonium chloride; N-(3-sulfopropyl)-N-methacrylamidopropyl-N,N-dimethyl ammonium betaine; N,N-dimethylacrylamide; N-methylacrylamide; nonylphenoxypoly(ethyleneoxy)ethylmethacrylate; partially hydrolyzed polyacrylamide; poly 2-amino-2-methyl propane sulfonic acid; polyvinyl alcohol; sodium 2-acrylamido-2-methylpropane sulfonate; quaternized dimethylaminoethylacrylate; quaternized dimethylaminoethylmethacrylate; any copolymer thereof; any derivative thereof; and any combination thereof. In certain embodiments, the viscosifying agent comprises an acrylamide/2-(methacryloyloxy)ethyltrimethylammonium methyl sulfate copolymer. In certain embodiments, the viscosifying agent may comprise an acrylamide/2-(methacryloyloxy)ethyltrimethylammonium chloride copolymer. In certain embodiments, the viscosifying agent may comprise a derivatized cellulose that comprises cellulose grafted with an allyl or a vinyl monomer, such as those disclosed in U.S. Pat. Nos. 4,982,793, 5,067,565, and 5,122,549, the entire disclosures of which are incorporated herein by reference.

Additionally, polymers, including homopolymers, copolymers, terpolymers, and quad polymers, that comprise one or more functional groups (e.g., hydroxyl, cis-hydroxyl, carboxylic acids, derivatives of carboxylic acids, sulfate, sulfonate, phosphate, phosphonate, amino, or amide groups) may be used as viscosifying agents.

The viscosifying agent may be present in the treatment fluids useful in the methods of the present invention in an amount sufficient to provide the desired viscosity. In some embodiments, the viscosifying agents (i.e., the polymeric material) may be present in an amount in the range of from about 0.1% to about 10% by weight of the treatment fluid.

In certain embodiments, the viscosifying agents may be present in an amount in the range of from about 0.15% to about 2.5% by weight of the treatment fluid.

In those embodiments of the present invention where it is desirable to crosslink the viscosifying agent, the treatment fluid may comprise one or more crosslinking agents. The crosslinking agents may comprise a borate ion, a metal ion, or similar component that is capable of crosslinking at least two molecules of the viscosifying agent. Examples of suitable crosslinking agents include, but are not limited to, borate ions; magnesium ions; chelated zirconium (IV) ions; chelated titanium (IV) ions; aluminum ions; antimony ions; chromium ions; iron ions; copper ions; zinc ions; and any combination thereof. These ions may be provided by providing any compound that is capable of producing one or more of these ions. Examples of such compounds include, but are not limited to, ferric chloride; boric acid; disodium octaborate tetrahydrate; sodium diborate; pentaborates; ulexite; colemanite; magnesium oxide; zirconium lactate; zirconium triethanol amine; zirconium triethanolamine lactate; zirconium carbonate; zirconium acetylacetonate; zirconium malate; zirconium citrate; zirconium diisopropylamine lactate; zirconium glycolate; zirconium triethanol amine glycolate; zirconium lactate glycolate; titanium lactate; titanium malate; titanium citrate; titanium ammonium lactate; titanium triethanolamine chloride; titanium acetylacetonate; aluminum lactate; aluminum citrate; antimony compounds; chromium compounds; iron compounds; copper compounds; zinc compounds; and any combination thereof.

In certain embodiments of the present invention, the crosslinking agent may be formulated to remain inactive until it is "activated" by, among other things, certain conditions in the treatment fluid (e.g., pH, temperature, etc.) and/or interaction with some other substance. In some embodiments, the activation of the crosslinking agent may be delayed by encapsulation with a coating (e.g., a porous coating through which the crosslinking agent may diffuse slowly, or a degradable coating that degrades downhole) that delays the release of the crosslinking agent until a desired time or place. The choice of a particular crosslinking agent will be governed by several considerations that will be recognized by one skilled in the art, including but not limited to the following: the type of viscosifying agent included, the molecular weight of the viscosifying agent(s), the conditions in the subterranean formation being treated, the safety handling requirements, the pH of the treatment fluid, temperature, and/or the desired delay for the crosslinking agent to crosslink the viscosifying agent molecules.

When included, suitable crosslinking agents may be present in the treatment fluids useful in the methods of the present invention in an amount sufficient to provide the desired degree of crosslinking between molecules of the viscosifying agent. In certain embodiments, the crosslinking agent may be present in the treatment fluids of the present invention in an amount in the range of from about 0.005% to about 1% by weight of the treatment fluid. In certain embodiments, the crosslinking agent may be present in the treatment fluids of the present invention in an amount in the range of from about 0.05% to about 1% by weight of the treatment fluid. One of ordinary skill in the art, with the benefit of this disclosure, will recognize the appropriate amount of crosslinking agent to include in a treatment fluid of the present invention based on, among other things, the temperature conditions of a particular application, the type of viscosifying agents used, the molecular weight of the viscosifying agents, the desired degree of viscosification, and/or the pH of the treatment fluid.

In some embodiments of the present invention, the present invention provides a method of performing a cleanout treatment in a wellbore in a subterranean formation. The wellbore is acid treated with an acid fluid comprising an aqueous base fluid and an acid, thereby causing the formation of unconsolidated particulates. Thereafter, a treatment fluid comprising an aqueous base fluid and a hydrophobically modified flocculating water-soluble polymer is introduced into the wellbore and at least a portion of the unconsolidated particulates are flocculated and suspended. Finally, the treatment fluid comprising the flocculated unconsolidated particulates is removed from the wellbore.

The acid fluid for use in the present invention may include an aqueous base fluid, as described herein, and any acid suitable for use in a subterranean formation. The aqueous base fluid for use in the acid fluid may be, but need not be, the same as that used in the treatment fluids of the present invention. Moreover, any of the additives that may be included in the treatment fluids of the present invention may also be included in the acid fluid, provided that they do not adversely affect the function of the acid in the acid fluid. Examples of suitable acids include, but are not limited to, hydrochloric acid; hydrofluoric acid; acetic acid; formic acid; citric acid; ethylene diamine terra acetic acid; glycolic acid; sulfamic acid; any derivative thereof; and any combination thereof. In some embodiments, hydrochloric acid; acetic acid; and formic acid are preferred. In some embodiments, the acid may be present in the acid fluid in an amount in the range of from about 0.5% to about 20% by weight of the acid fluid. In other embodiments, the acid may be present in the acid fluid in an amount in the range of from about 5% to about 15% by weight of the acid fluid.

In some embodiments, a corrosion inhibitor is added to the treatment fluids or acid fluids of the present invention. Typically, corrosion inhibitors are used to protect metals from the corrosive effect of salts and/or acids placed in the formation (e.g., from a brine base fluid) employed during drilling, completion, cleanout, workovers, and other subterranean formation operations. The corrosion inhibitors are deposited on the metals to protect them. Suitable corrosion inhibitors for use in the fluids of the present invention include, but are not limited to, aetylenic alcohol; an unsaturated carbonyl compound; an unsaturated ether compound; formamide; formic acid; formate; a carbonyl compound; an iodide; a terpene; an aromatic hydrocarbon; coffee; tobacco; gelatin; cinnamaldehyde; propargyl alcohol; a fluorinated surfactant; a quaternary derivative of a heterocyclic nitrogen base; a quaternary derivative of a halomethylated aromatic compound; a tertiary amine; a quaternary ammonium compound; an aldehyde; 1-(Benzyl)quinolinium chloride; any in combination with iodine; any derivative thereof; and any combination thereof. In some embodiments, the corrosion inhibitor may be a reaction product of an aldehyde, a carbonyl containing compound, and a nitrogen containing compound. A suitable commercially available corrosion inhibitor includes, but is not limited to, HAI-404M™ Corrosion Inhibitor, available from Halliburton Energy Services, Inc. in Houston, Tex. HAI-404M™ inhibitor is a cationic, aldehyde-blend acid corrosion inhibitor for use in hydrochloric acid up to 400° F. (204° C.) in 15% HCl. Generally, the amount of corrosion inhibitor is present in the range of from about 0.1% to about 3% by volume of the acid fluid or the treatment fluid of the present invention. In some embodiments, the corrosion inhibitors may be suspended in an alcohol, such as methanol or isopropanol, for storage purposes, for example. The presence of such alcohol should not change the volume of the corrosion inhibitors typically used in the methods of the present invention.

Corrosion inhibitors are often difficult to solubilize in aqueous fluids used in subterranean formation operations due to their hydrophobic nature and, therefore, are typically only loosely emulsified with vigorous agitation which is incapable of preventing them from separating out as a different phase once placed in the wellbore. Such separation often prevents the corrosion inhibitors from evenly adhering to metals. Another benefit of the hydrophobically modified flocculating water-soluble polymers of the present invention is that they are capable of solubilizing corrosion inhibitors within the treatment fluid or upon contact with the hydrophobically modified flocculating water-soluble polymers if the corrosion inhibitor is added to the acid fluid. The molecules of the corrosion inhibitors are solubilized in the micelles formed by the by the hydrophobic compound(s) of the hydrophobically modified flocculating water-soluble polymers.

To facilitate a better understanding of the present invention, the following examples of preferred or representative embodiments are given. In no way should the following examples be read to limit, or to define, the scope of the invention.

Example 1

A hydrophobically modified flocculating water-soluble polymer, HPT-1®, was tested to determine its ability to solubilize HAI-404M™ Corrosion Inhibitor. To a first vial, 49.5 ml of fresh water and 0.5 ml of HAI-404M™ was added. To a second vial, 39.5 ml of fresh water, 0.5 ml of HAI-404M™, and 500 ppm (10 ml) of HPT-1® was added. From visual inspection, the first vial formed an opaque liquid suspension due to the insolubility of the corrosion inhibitor in the water. However, the second vial formed a translucent liquid suspension, demonstrating the ability of the hydrophobically modified flocculating water-soluble polymer to solubilize the corrosion inhibitor.

Example 2

In this example, the flocculating capability of the hydrophobically modified flocculating water-soluble polymer was evaluated. Two suspensions were prepared. The first suspension comprised 0.1% of Brazos River sand in tap water. The second suspension comprised 0.1% of Brazos River sand in tap water and 500 ppm (7 ml) of the hydrophobically modified flocculating water-soluble polymer, HPT-1®. The Brazos River sand in both suspensions settled under static conditions. However, the Brazos River sand in the second suspension, containing HTP-1®, agglomerated into clumps, which moved as agglomerated masses that did not disperse upon agitation. This agglomeration was not observed in the first suspension, and the Brazos River sand remained in discrete particles, even upon agitation.

Example 3

A suspension was prepared identical to the second suspension in Example 2, and agglomerated clumps of the Brazos River sand was again observed. To the suspension, 0.3% of viscosifying agent hydroxyethyl cellulose was added, which prevented settling of the agglomerated clumps. This observation indicates that fine particulates (e.g., the Brazos River sand) can be agglomerated by the use of a hydrophobically modified flocculating water-soluble polymer, and a viscosifying agent may aid in circulating such agglomerated particulates out of a wellbore by maintaining them in suspension.

Example 4

A suspension was prepared identical to the second suspension in Example 2, and agglomerated clumps of the Brazos River sand was again observed. To the suspension, 0.3% of viscosifying agent diutan was added, which prevented settling of the agglomerated clumps. This observation indicates that fine particulates (e.g., the Brazos River sand) can be agglomerated by the use of a hydrophobically modified flocculating water-soluble polymer, and a viscosifying agent may aid in circulating such agglomerated particulates out of a wellbore by maintaining them in suspension.

Embodiments disclosed herein include:

A. A method of performing a cleanout treatment in a wellbore in a subterranean formation having unconsolidated particulates. A treatment fluid comprising an aqueous base fluid and a hydrophobically modified flocculating water-soluble polymer is introduced into the wellbore. At least a portion of the unconsolidated particulates are then flocculated and suspended. Finally, the treatment fluid comprising the flocculated unconsolidated particulates is removed from the wellbore.

B. A method of performing a cleanout treatment in a wellbore in a subterranean formation. The wellbore is acid treated with an acid fluid comprising an aqueous base fluid and an acid, thereby causing the formation of unconsolidated particulates. Thereafter, a treatment fluid comprising an aqueous base fluid and a hydrophobically modified flocculating water-soluble polymer is introduced into the wellbore and at least a portion of the unconsolidated particulates are flocculated and suspended. Finally, the treatment fluid comprising the flocculated unconsolidated particulates is removed from the wellbore.

C. A method of performing a cleanout treatment in a wellbore in a subterranean formation having unconsolidated particulates. A treatment fluid comprising an aqueous base fluid, a hydrophobically modified flocculating water-soluble polymer, and a corrosion inhibitor is introduced into the wellbore. The corrosion inhibitor is solubilized in the treatment fluid by contact with the hydrophobically modified flocculating water-soluble polymer. After introducing the treatment fluid into the wellbore, at least a portion of the unconsolidated particulates are then flocculated and suspended. Finally, the treatment fluid comprising the flocculated unconsolidated particulates is removed from the wellbore.

Each of embodiments A, B, and C may have one or more of the following additional elements in any combination:

Element 1: Wherein the hydrophobically modified flocculating water-soluble polymer is formed by hydrophobic modification of a hydrophilic polymer.

Element 2: Wherein the hydrophobically modified flocculating water-soluble polymer is formed by hydrophobic modification of a hydrophilic polymer, the hydrophilic polymer of which is formed by a polymerization reaction of hydrophilic monomers.

Element 3: Wherein the hydrophobically modified flocculating water-soluble polymer is formed by a polymerization reaction of a hydrophilic monomer and a hydrophobically modified hydrophilic monomer.

Element 4: Wherein the hydrophobically modified flocculating water-soluble polymer is hydrophobically modified with a hydrophobic compound selected from the group consisting of octenyl succinic acid; an anhydride of octenyl succinic acid; an ester of octenyl succinic acid; an imide of octenyl succinic acid; an amide of octenyl succinic acid; dodecenyl succinic acid; an anhydride of dodecenyl succinic acid; an ester of dodecenyl succinic acid; an imide of dodecenyl succinic acid; an amide of dodecenyl succinic acid; vinyl ester; alkyl ester of acrylic acid; alkylaryl alcohol ester of acrylic acid; alkyl ester of methacrylic acid; alkylaryl alcohol ester of methacrylic acid; alkyl halide; butadiene; 1-vinylnaphthalene; and any combination thereof.

Element 5: Wherein the hydrophobically modified flocculating water-soluble polymer further comprises a hydrophilic modification with a hydrophilic group selected from the group consisting of a hydroxyl group; a carbonyl group; a carboxyl group; a sulfhydryl group; an amino group; a phosphate group; a polyether group; any derivative thereof; and any combination thereof.

Element 6: Wherein the hydrophobically modified flocculating water-soluble polymer imparts fluid loss control to the treatment fluid.

Element 7: Wherein the hydrophobically modified flocculating water-soluble polymer acts as a relative permeability modifier for the subterranean formation so as to reduce permeability of the subterranean formation to water.

Element 8: Wherein the treatment fluid further comprises a supplemental polymer selected from the group consisting of of a non-hydrophobically modified flocculating polymer; a relative permeability modifier polymer; and any combination thereof.

Element 9: Wherein the treatment fluid further comprises a corrosion inhibitor that is solubilized in the treatment fluid by contact with the hydrophobically modified flocculating water-soluble polymer.

By way of non-limiting example, exemplary combinations applicable to A, B, C include: A in combination with 2, 6, and 7; A in combination with 4 and 5; B in combination with 7, 8, 9, and 10; B in combination with 5; C in combination with 1, 2, 9, and 10; C in combination with 4, 5, and 8.

Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope and spirit of the present invention. The invention illustratively disclosed herein suitably may be practiced in the absence of any element that is not specifically disclosed herein and/or any optional element disclosed herein. While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the element that it introduces. If there is any conflict in the usages of a word or term in this specification and one or more patent or other documents that may be incorporated herein by reference, the definitions that are consistent with this specification should be adopted.

The invention claimed is:

1. A method comprising:
providing a treatment fluid comprising an aqueous base fluid, a hydrophobically modified flocculating water-soluble polymer, a corrosion inhibitor present in the treatment fluid in an amount in the range of about 0.1% to about 3% by volume of the treatment fluid, and separate supplemental polymers present in the treatment fluid in an amount in the range of about 0.5% to about 5% by weight of the treatment fluid,
wherein the separate supplemental polymers are a combination of a non-hydrophobically modified flocculating polymer of a poly(diallyldimethylammonium chloride) and a relative permeability modifier polymer;
introducing the treatment fluid into a wellbore in a subterranean formation having unconsolidated particulates therein;
flocculating at least a portion of the unconsolidated particulates by exposure to the hydrophobically modified flocculating water-soluble polymer;
removing the treatment fluid comprising the flocculated unconsolidated particulates from the wellbore in the subterranean formation.

2. The method of claim 1, wherein the hydrophobically modified flocculating water-soluble polymer is formed by hydrophobic modification of a hydrophilic polymer.

3. The method of claim 2, wherein the hydrophilic polymer is formed by a polymerization reaction of hydrophilic monomers.

4. The method of claim 1, wherein the hydrophobically modified flocculating water-soluble polymer is formed by a polymerization reaction of a hydrophilic monomer and a hydrophobically modified hydrophilic monomer.

5. The method of claim 1, wherein the hydrophobically modified flocculating water-soluble polymer is hydrophobically modified with a hydrophobic compound selected from the group consisting of octenyl succinic acid; an anhydride of octenyl succinic acid; an ester of octenyl succinic acid; an imide of octenyl succinic acid; an amide of octenyl succinic acid; dodecenyl succinic acid; an anhydride of dodecenyl succinic acid; an ester of dodecenyl succinic acid; an imide of dodecenyl succinic acid; an amide of dodecenyl succinic acid; vinyl ester; alkyl ester of acrylic acid; alkylaryl alcohol ester of acrylic acid; alkyl ester of methacrylic acid; alkylaryl alcohol ester of methacrylic acid; alkyl halide; butadiene; 1-vinylnaphthalene; and any combination thereof.

6. The method of claim 1, wherein the hydrophobically modified flocculating water-soluble polymer further comprises a hydrophilic modification with a hydrophilic group selected from the group consisting of a hydroxyl group; a carbonyl group; a carboxyl group; a sulfhydryl group; an amino group; a phosphate group; a polyether group; any derivative thereof; and any combination thereof.

7. The method of claim 1, wherein the hydrophobically modified flocculating water-soluble polymer imparts fluid loss control to the treatment fluid.

8. The method of claim 1, wherein the hydrophobically modified flocculating water-soluble polymer acts as a relative permeability modifier for the subterranean formation so as to reduce permeability of the subterranean formation to water.

9. The method of claim 1, wherein the corrosion inhibitor is solubilized in the treatment fluid by contact with the hydrophobically modified flocculating water-soluble polymer.

10. A method comprising:
providing an acid fluid comprising a first aqueous base fluid and an acid;
providing a treatment fluid comprising a second aqueous base fluid, a hydrophobically modified flocculating water-soluble polymer, separate supplemental polymers present in the treatment fluid in an amount in the range of about 0.5% to about 5% by weight of the treatment fluid, and a corrosion inhibitor present in the treatment fluid in an amount in the range of about 0.1% to about 3% by volume of the treatment fluid,
wherein the separate supplemental polymers are a combination of a non-hydrophobically modified flocculating polymer of a poly(diallyldimethylammonium chloride) and a relative permeability modifier polymer;
acid treating a wellbore in a subterranean formation with the acid fluid, thereby forming unconsolidated particulates;
introducing the treatment fluid into the wellbore in the subterranean formation after acid treating the wellbore in the subterranean formation;
flocculating at least a portion of the unconsolidated particulates by exposure to the hydrophobically modified flocculating water-soluble polymer;
removing the treatment fluid comprising the flocculated unconsolidated particulates formed from the acid treatment from the wellbore in the subterranean formation.

11. The method of claim 10, wherein the hydrophobically modified flocculating water-soluble polymer is formed by hydrophobic modification of a hydrophilic polymer.

12. The method of claim 11, wherein the hydrophilic polymer is formed by a polymerization reaction of hydrophilic monomers.

13. The method of claim 10, wherein the hydrophobically modified flocculating water-soluble polymer is formed by a polymerization reaction of a hydrophilic monomer and a hydrophobically modified hydrophilic monomer.

14. The method of claim 10, wherein the hydrophobically modified flocculating water-soluble polymer is hydrophobically modified with a hydrophobic compound selected from the group consisting of octenyl succinic acid; an anhydride of octenyl succinic acid; an ester of octenyl succinic acid; an imide of octenyl succinic acid; an amide of octenyl succinic acid; dodecenyl succinic acid; an anhydride of dodecenyl succinic acid; an ester of dodecenyl succinic acid; an imide of dodecenyl succinic acid; an amide of dodecenyl succinic acid; vinyl ester; alkyl ester of acrylic acid; alkylaryl alcohol ester of acrylic acid; alkyl ester of methacrylic acid; alkylaryl alcohol ester of methacrylic acid; alkyl halide; butadiene; 1-vinylnaphthalene; and any combination thereof.

15. The method of claim 10, wherein the hydrophobically modified flocculating water-soluble polymer further comprises a hydrophilic modification with a hydrophilic group selected from the group consisting of a hydroxyl group; a carbonyl group; a carboxyl group; a sulfhydryl group; an amino group; a phosphate group; a polyether group; any derivative thereof; and any combination thereof.

16. The method of claim 10, wherein the hydrophobically modified flocculating water-soluble polymer imparts fluid loss control to the treatment fluid.

17. The method of claim 10, wherein the hydrophobically modified flocculating water-soluble polymer acts as a relative permeability modifier for the subterranean formation so as to reduce permeability of the subterranean formation to water.

* * * * *